(12) United States Patent
Schroeder et al.

(10) Patent No.: US 7,494,145 B2
(45) Date of Patent: Feb. 24, 2009

(54) AXLE WITH NON-ROUND TAPERED ENDS AFFIXED INTO FORK LEG DROPOUTS WITH OPENINGS THAT MATCH THE AXLE ENDS FOR A BICYCLE FORK

(75) Inventors: Brady Matthew Schroeder, Simi Valley, CA (US); James Chris Rathbun, Burbank, CA (US)

(73) Assignee: Answer Products, Inc., Valencia, CA (US)

( * ) Notice: Subject to any disclaimer, the term of this patent is extended or adjusted under 35 U.S.C. 154(b) by 292 days.

(21) Appl. No.: 11/588,740

(22) Filed: Oct. 27, 2006

(65) Prior Publication Data

US 2008/0116658 A1    May 22, 2008

(51) Int. Cl.
   *B60B 27/06*    (2006.01)
(52) U.S. Cl. ............... 280/276; 301/111.06; 301/110.6; 301/124.2; 301/110.5
(58) Field of Classification Search ............. 280/276; 301/111.06, 110.6, 110.5, 124.2
   See application file for complete search history.

(56) References Cited

U.S. PATENT DOCUMENTS

| | | | |
|---|---|---|---|
| 3,919,898 A * | 11/1975 | Sugino ............. | 74/594.2 |
| 5,129,711 A | 7/1992 | Chen | |
| 5,494,390 A | 2/1996 | Gonzales | |
| 5,531,511 A | 7/1996 | McMurtrey | |
| 5,673,925 A | 10/1997 | Stewart | |
| 5,997,104 A | 12/1999 | Campagnolo | |
| 6,059,378 A | 5/2000 | Dougherty | |
| 6,412,803 B1 * | 7/2002 | Lalikyan et al. ............. | 280/276 |
| 6,572,199 B1 | 6/2003 | Creek | |
| 6,652,037 B2 | 11/2003 | Chen | |
| 6,772,656 B2 * | 8/2004 | Godoy et al. ............. | 81/9.22 |
| 6,886,894 B2 | 5/2005 | Kanehisa | |
| 7,090,308 B2 * | 8/2006 | Rose et al. ............. | 301/110.5 |
| 7,344,313 B2 * | 3/2008 | Hansen et al. ............. | 384/538 |
| 7,351,000 B2 * | 4/2008 | Meggiolan ............. | 403/322.4 |
| 2002/0140201 A1 * | 10/2002 | Kirk ............. | 280/279 |

* cited by examiner

*Primary Examiner*—Lynda Jasmin
*Assistant Examiner*—Patrick Centolanzi
(74) *Attorney, Agent, or Firm*—Thomas I. Rozsa

(57) ABSTRACT

The present invention relates to a bicycle fork comprising an improved axle with non-round tapered ends affixed into dropouts with openings to match the axle ends through a taper-lock affixation for improving the torsional strength of the fork and facilitate ease of the axle installation. The improved axle consists of a first non-round end with interior female threads connecting an intermediate cylindrical portion which connects to a second non-round tapered end. An improved tapered split non-round nut having a cylindrical bolt possessing male threads lock the nut to the first end of the axle, wherein said bolt has an another preferred embodiment which connects a rotatable handle for ease of the axle installation.

22 Claims, 11 Drawing Sheets

AXLE WITH NON-ROUND TAPERED ENDS AFFIXED INTO FORK LEG DROPOUTS WITH OPENINGS THAT MATCH THE AXLE ENDS FOR A BICYCLE FORK

BACKGROUND OF THE INVENTION

1. Field of the Invention

The present invention is related to an axle which is used to connect the lower sections of the leg portions of a bicycle fork in order to increase the torsional stiffness of the fork.

2. Description of the Prior Art

The following 10 patents and published patent applications are the closest prior art references to the present invention.

1. U.S. Pat. No. 5,494,390 issued to Michael Gonzales on Feb. 27, 1996 for "Quick Release Mechanism For Securing Parts To Bicycles" (hereafter the "Gonzales Patent");

2. U.S. Pat. No. 5,531,511 issued to David K. McMurtrey et al. and assigned to Wald Manufacturing Co., Inc. on Jul. 2, 1996 for "Bicycle Hub Cone Nut Locking Arrangement" (hereafter the "McMurtrey Patent");

3. U.S. Pat. No. 5,673,925 issued to Christopher R. Stewart on Oct. 7, 1997 for "Quick Release Skewer System" (hereafter the "Stewart Patent");

4. U.S. Pat. No. 5,997,104 issued to Valentino Campagnolo and assigned to Campagnolo S.r.l. on Dec. 7, 1999 for "Device For Rotatably Supporting A Hub Of A Bicycle Wheel" (hereafter the "Campagnolo Patent");

5. U.S. Pat. No. 6,059,378 issued to Michael C. Dougherty et al. and assigned to Impact Forge, Inc. on May 9, 2000 for "Taperlock Axle Apparatus And Flange" (hereafter the "Dougherty Patent");

6. U.S. Pat. No. 6,412,803 issued to Eric E. Lalikyan et al. and assigned to Answer Products, Inc. on Jul. 2, 2002 for "Front Fork For Cycles" (hereafter the "Lalikyan Patent");

7. U.S. Pat. No. 6,572,199 issued to Steve W. Creek et al. and assigned to General Motors Corporation on Jun. 3, 2003 for "Flanged Tubular Axle Shaft Assembly" (hereafter the "Creek Patent");

8. U.S. Pat. No. 5,129,711 issued to Kun-Ten Chen on Jul. 14, 1992 for "Bicycle Free-Wheel" (hereafter the "711 Chen Patent");

9. U.S. Pat. No. 6,652,037 issued to Hurbert Chen and assigned to Kun Teng Industry Co., Ltd. on Nov. 25, 2003 for "Hub And Axle Assembly For A Bicycle" (hereafter the "037 Chen Patent");

10. U.S. Pat. No. 6,886,894 issued to Takanori Kanehisa et al. and assigned to Shimano, Inc. on May 3, 2005 for "Bicycle Hub Axle" (hereafter the "Kanehisa Patent").

The Gonzales Patent discloses a quick release mechanism for securing an axle of a bicycle to the frame. Specifically, the arms of the front fork 13 and 14 have the axle 12 extending between them. The quick release mechanism which is designated generally by the numeral 21 includes an elongated secure element 22 which extends coaxially through axle 12 and has a threaded portion 23 toward one end and an elongated head portion 24 toward the other end. The fastening element in the form of a nut 26 is mounted on the skewer to secure the hub assembly 11 to the fork upon rotation in a first direction and to release the assembly 11 from the fork upon rotation in the opposite direction. The hub secured to the fork arm 13 is clamped between nuts 26 and 19 and arm 14 is clamped between head portion 24 and 19. This patent discusses a having a conically tapered body with an o-ring 59 mounted in the peripheral groove in the side wall thereof.

The McMurtrey Patent is a bicycle hub cone nut locking arrangement. There is a front hub assembly of a bicycle wheel having an improved cone nut locking mechanism which includes a hub body having a bore therethrough and an axle extending through the bore having threaded ends. FIG. 1 shows the front hub assembly of a bicycle wheel having the improved cone nut locking mechanism of the present invention. Hub assembly 10 includes a hub body 12 with a center section 14 and hub flanges 16 positioned at either end of the center section 14. Hub body 12 has an internal bore 17 therethrough which extends through the center section 14 and through openings in each flange 16. An axle 18 extends longitudinally through bore 17 with body 12 and extends through the flange openings and past the ends of the flange. Each flange 16 forms and outer bearing race 19 which receives circular bearing structures 20 therein. Bearing structure 20 surrounds the axle 18. Cone nuts 22, 24 are threaded onto the threaded ends or end sections 26, 28, respectively, of axle 18. The cone nuts 22, 24 include inner bearing races 29 which cooperate with outer bearing races 19 to hold the ball bearing structures 20 within the hub body 12 so that body 12 may rotate around axle 18. Cone nuts 22, 24 are threaded onto threaded ends 26,28 until they reach the respective first resistance portion or section 30 and second resistance portion or section 32.

The Stewart Patent is a quick release skewer mechanism which consists of a connecting rod and an expandable retaining nut on the other end to attach the axle to the dropouts. Specifically, "FIG. 1 illustrates a bicycle axle/quick release skewer system 1 consisting of a central connecting rod 2, a lever actuated cam assembly 3 at one end of the connecting rod, and an expandable retaining nut 4 at the opposite end of the rod 2. The mid-section of retaining rod 2 is encased in a hollow center tubular shaft 5, which includes lock nuts 6a and cone nuts 6b at either end. The tubular shaft 5 is shorter than the connecting rod 2, so that both ends of the connecting rod 2 protrude from the ends of the tubular shaft 5.

"As best illustrated in FIGS. 3-5, the retaining nut 4 is expandable in the axial direction. As illustrated in FIG. 3, the expandable retaining nut 4 of the present invention includes a T-nut member 20 and an annular collar member 21. The T-nut member 20 is comprised of a cylindrical body portion 22 and opposed radially extending arms 23. The cylindrical body portion 22 includes an internal threaded channel 24 designed to threadably receive the protruding threaded end of the connecting rod 2. Preferably, the internal threaded channel 24 is fitted with a rotation resistant device, such as a nylon insert of the type sold under the trademark "Nylock" (not shown). With such rotation resistant devices, while the T-nut can be screwed on and off the threaded connecting rod 2, the Nylock insert prevents accidental rotation of the T-nut, such as is sometimes caused during the expansion or contraction of the retaining nut 4.

Finally, the axle/skewer 1 must be clamped tightly and securely on the bicycle fork dropouts 8. To do this, the operator simply pivots the cam lever 12 from position 12b to 12a, which returns the cap 9 from position 13b to 13a. With the cam assembly 3 in this position, the gaps 7a and 7b are returned to their original widths, causing the bicycle fork dropouts 8 to be tightly clamped between the retaining nut 4 and spacer nuts 6a, on the other hand, and between the cam assembly 3 and spacer nut 6a on the other hand."

The Campagnolo Patent discloses a device for rotatably supporting a hub of a bicycle wheel on a shaft which includes at least one annular element with an outer conical surface which is pressed between the outer surface of the shaft and the inner conical surface of the inner ring of a rolling bearing. Referring to FIG. 5, the hub 1 is rotatably supported on a shaft 6. Referring to FIG. 3, on one end of the shaft, there is a portion 18 having a conical surface cooperating with a corresponding conical surface 19 formed in the inner surface of the inner ring 12a of the bearing 12. When the conical annular element 13 is pushed up to its operative position, the axial force imparted to bearing 11 is transmitted by hub 1 to bearing 12 so that inner ring 12a of the later engages on the conical surface 18 of the shaft 6 thus providing a safe clamping also for bearing 12. "When ring nut 16 is screwed until it pushes the conical annular element 13 to its operative position, it can be locked in this position. To this end, the ring nut 16 has a slot 16a and is provided with a clamping tangential screw 16b which can be tightened to lock the ring nut 16 by friction in the reached position. Naturally, instead of this arrangement, it is possible to adopt any other clamping and locking means, such as a ring nut with an additional lock nut or a self-locking ring nut."

The Lalikyan Patent discloses an axle with non-rounded enlarged ends which attach to a corresponding non-rounded portion of a lower fork leg to prevent the two fork legs from torsionally rotating relative to each other. By making the ends of the axle a non-rounded shape, there is a better steering mechanism, which also avoids the possibility of slip between fork legs and axle. However, a drawback of the Lalikyan Patent is that non-round ends of the axle are not tapered. Further, the dropout, which accommodates the non-round ends, has a slot 48 that extends upwardly in communication with the dropout opening 40. Therefore it is necessary for the Lalikyan Patent to have additional transverse clamping bolts 50, which are used to tighten the bifurcated portions 22c and 22d of the dropout toward each other, thereby to clamp the enlarged non-round end 6a of the axle within the dropout opening 40.

The Dougherty Patent is described as a taperlock axle apparatus and flange. This discloses "a flange and shaft for a two-piece forged axle and method for forging same. The flange includes a hub formed concentric about a longitudinal axis wherein the hub defines an inner annular face, an outer annular face, and a bore extending there between. The bore includes a first tapered surface diverging from the longitudinal axis. The flange further includes an annular ring coaxial and integral with the hub as well as locking arrangement integral with the tapered surface for mechanically coupling the flange for rotation with a shaft." Referring to FIG. 2, the shaft is 12 and the flange is 14 and there is a tapered interface 16 circumscribing shaft proximate to the first shaft 18. In this case the patent shows the concept of a flange which is connected to a shaft to form an axle wherein the flange includes a first tapered surface extending from the cylindrical surface toward the second annular face and diverging from said longitudinal axis of the shaft which is formed within the flange.

The Creek Patent discloses a flanged tubular axle shaft assembly. Specifically this discloses "a flanged axle shaft assembly includes a shaft having a tubular wall and an open end, a flange hub having a central opening fitted over the shaft and secured to the open end, and wall into compressive engagement with the flange hub opening to provide for transmission of forces between the shaft and the flange hub." There is shown a flange actual shaft assembly 10 which includes a tubular shaft 12 a flange hub 14 mounted on the open outer end 16 of the shaft and an end wedge 18 secured in the open end 16. The end wedge expands the tubular wall 19 of the shaft into compressive engagement with a central opening 20 and the flange hub 14 to provide a mechanical connection that supports transmission of substantial torsional and axial forces between the shaft and the flange. A portion of the outer end is flared radially outward at 28 to provide an end stop.

The 711 Chen Patent discloses an assembly for a bicycle free-wheel which deals with two opposite securing members 134 and 336 as shown in FIG. 1. "Referring to FIGS. 1-3, a free-wheel for a bicycle rear wheel includes a shaft 12 and a tubular hub member 10 rotatably sleeved around the shaft 12 and having a first and a second end 10', 10". The first end 10' of the hub member 10 has a ball recess 13 formed thereon. A bearing assembly received in the ball recess 13 includes a ball casing 131, a ball seat with balls 132, a dust protector unit 133, a securing member 134, a washer unit 135, and a nut 136. The downwardly extending flange 14 having a plurality of recesses 141 formed thereon."

The 037 Chen Patent discloses a hub and axle assembly for a bicycle. This was cited because of left and right mounting sleeve members 33. "Left and right mounting sleeve members 33 are sleeved on the axle 20. Each of the left and right mounting sleeve members 33 has a curved surrounding race portion 331 which is disposed proximate to and which is spaced apart from a respective one of the left and right surrounding shoulders 111 along an inclined line that forms an acute angle with the axis of the axle 20, and a surrounding abutment portion 332 opposite to the surrounding race portion 331 and proximate to a respective one of the left and right lateral ends 113, 114."

Finally, the Kanehisa Patent which is issued to Shimano, Inc. discloses a bicycle hub axle. Referring to FIG. 2, the hub axle nut 46 is hard, rigid one piece unitary member that includes a threaded bore 46a. The threaded bore 46a is threadedly engaged with the threaded section 51b of the shaft portion 51 that secures the bicycle hub axle assembly 31 to the bicycle frame 16. However, the overall design from FIG. 2 as well as FIG. 3 is different. It does include the threaded nut but it does not have the concept of the non-round split tapered locking assembly.

There is a significant need to significantly improve the axle with nut and bolt through it so as to improve the torsional strength of the bicycle fork and facilitate ease of the axle installation for bicycles.

SUMMARY OF THE INVENTION

The present invention relates to a bicycle fork comprising an improved axle with non-round tapered ends affixed into dropouts with openings to match the axle ends through a taper-lock affixation for improving the torsional strength of the fork and facilitate ease of the axle installation. The improved hollow axle consists of a first non-round end with interior female threads connecting an intermediate cylindrical portion which connects a second non-round tapered end, wherein an improved tapered split non-round nut and a cylindrical bolt possessing male threads lock the first end of the axle. The improved tapered split non-round nut has a tapered exterior wall containing a split along an axle axis to comprise an interior non-round surface for the first non-round end of the axle. The axle connects respective dropouts located at the lower end of the fork legs. The respective dropout openings are filled by the improved tapered nut incorporated with the first end of the axle and the second tapered end of the axle, wherein the interior surface of the openings matches exterior surface of the axle ends. The male threaded cylindrical bolt having a round head tightens the improved tapered non-round nut onto the first non-round end of the axle, which results in the split tapered nut being pressed in and self-tightened within the opening of the first dropout, and the second tapered non-round end of the axle is simultaneously pulled in and self tightened within the opening of the second dropout, so that a strong torsional strength of the fork is achieved after the axle is tightly affixed into the bicycle fork. In addition, a variation of the male threaded bolt is disclosed to contain a clamp end which is a rotatable handle which links a non-threaded end of the bolt for use to quickly tighten or release the bolt from the axle.

It has been discovered, according to the present invention, that if a hollow axle for a bicycle fork can be used to affix the respective dropouts of the fork legs, strong torsional strength of the fork and easier installation of the axle can be achieved, wherein said axle comprises a first non-round end connected to an intermediate cylindrical portion, which is further connected to a second tapered non-round end, wherein the first non-round end includes an improved tapered non-round nut having a tapered exterior wall with a split to form an interior surface for the first axle end and a cylindrical bolt having a male threaded end.

It has been further discovered, according to the present invention, that if an improved tapered non-round nut matches a first end of the axle, which is placed into a dropout opening of the fork, the axle can be tightly affixed into the corresponding non-round opening of the fork dropout through a taper-lock affixation, wherein the improved nut comprises a tapered exterior wall with a split to construct an interior non-round surface for the first end of the axle which is driven by a cylindrical bolt having a male threaded end, which is screwed into the first female threaded end of the axle.

It has also been discovered, according to the present invention, that if the interior surface of the first and second dropout openings match the exterior surface of the respective improved tapered non-round nut at the first end and the second tapered non-round end of the axle, the axle can be tightly affixed into the corresponding openings of the fork dropouts through a taper-lock affixation, wherein an improved nut that comprises the tapered exterior wall with a split to construct an interior non-round surface for the first end of the axle is driven by a cylindrical bolt where a male threaded end of the bolt is screwed into a first female threaded end of the axle.

It has additionally been discovered, according to an another preferred embodiment of the present invention, to modify the male threaded cylindrical bolt used with the present invention so that if the bolt at its non-threaded end is linked to a rotatable handle which can rotate around the non-threaded end as the rotational center, then the handle can be used to respectively easily tighten or release the male threaded cylindrical bolt into or out of the axle due to the leverage provided by the handle.

It is therefore a primary object of the present invention to provide a bicycle fork, wherein a hollow axle for a bicycle fork can be used to affix the respective dropouts of the fork legs, to achieve strong torsional strength of the fork and easier installation of the axle can be achieved, wherein said axle comprises a first non-round end connected to an intermediate cylindrical portion, which is further connected to a second tapered non-round end, wherein the first non-round end includes an improved tapered non-round nut having a tapered exterior wall with a split to form an interior surface for the first axle end and a cylindrical bolt having a male threaded end.

It is a further object of the present invention to provide an improved tapered non-round nut matches a first end of the axle, which is placed into a dropout opening of the fork, so that the axle can be tightly affixed into the corresponding non-round opening of the fork dropout through a taper-lock affixation, wherein the improved nut comprises a tapered exterior wall with a split to construct an interior non-round surface for the first end of the axle which is driven by a cylindrical bolt having a male threaded end, which is screwed into the first female threaded end of the axle.

It is another object of the present invention to have a design wherein the interior surface of the first and second dropout openings match the exterior surface of the respective improved tapered non-round nut at the first end and the second tapered non-round end of the axle, so that the axle can be tightly affixed into the corresponded openings of the fork dropouts through a taper-lock affixation, wherein the improved nut that comprises tapered exterior wall with a split to construct an interior non-round bore for the first end of the axle is driven by a cylindrical bolt where a male threaded end of the bolt is screwed into the first female threaded end of the axle.

It is an additional object of the present invention to provide an another preferred embodiment of the male threaded cylindrical bolt, wherein the bolt at its non-threaded end links has a rotatable clamp which is comprised of a rotatable handle which can rotate around the non-threaded end as the rotational center, so that the handle can be used to respectively easily tighten or release the male threaded cylindrical bolt into or out of the axle due to the leverage provided by the handle.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is an improved fork axle with non-round tapered ends affixed into fork leg dropouts with openings that match the axle ends, which provides a taper-lock affixation to improve the torsional strength of the fork and facilitate ease of axle installation for a bicycle fork.

Figure 1:
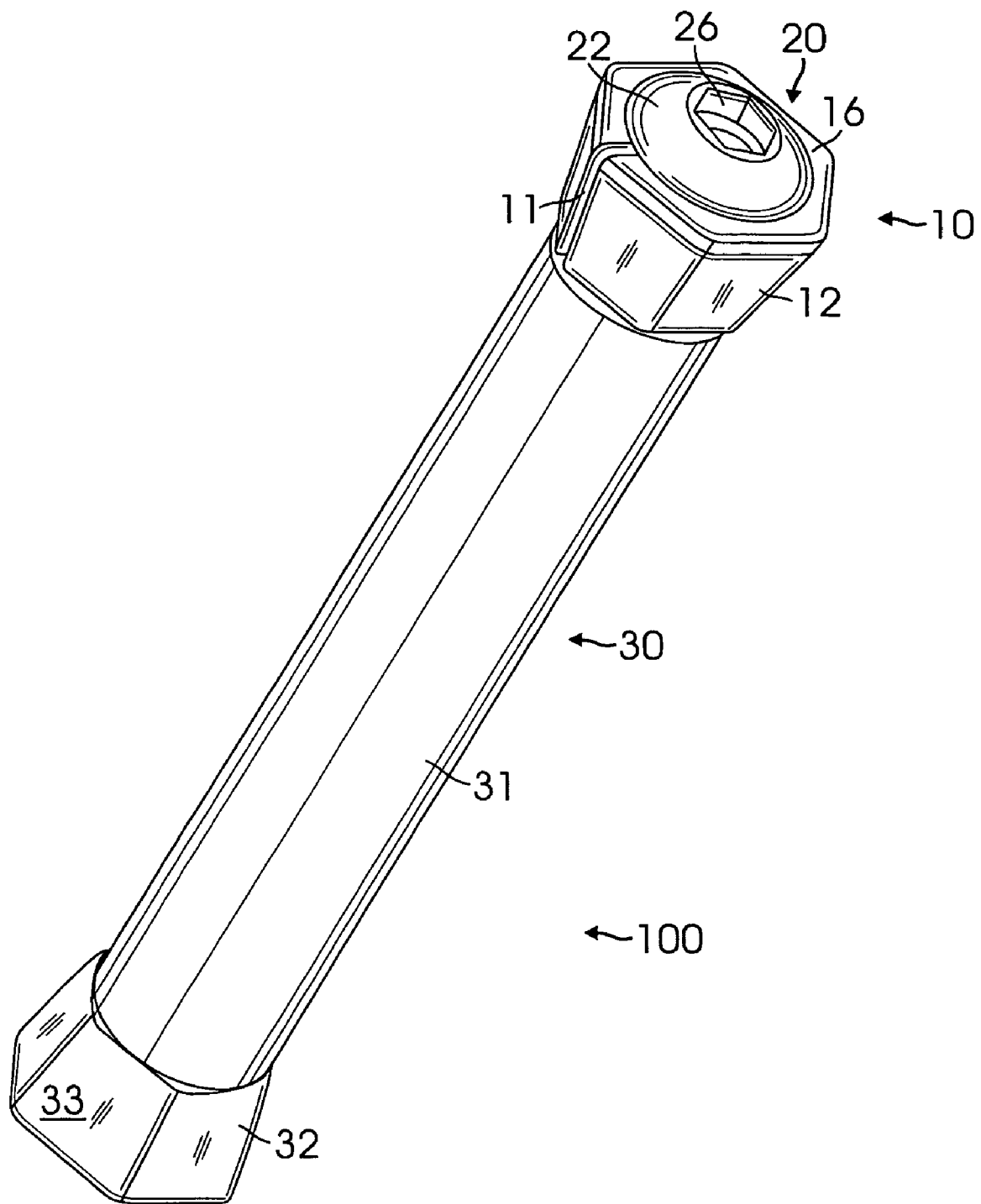
FIG. 1 is a perspective view of one preferred embodiment of the present invention improved fork axle.

Referring first to FIG. 1, there is illustrated one preferred embodiment of the present invention improved fork axle 100 with non-round tapered ends, comprising an improved tapered split hexagonal nut 10 affixed by a hollow cylindrical bolt 20 with a round head 22 to cover a first end of a hollow axle body 30 having a second distal tapered hexagonal end 32. It will be appreciated that the hexagonally tapered end is one of the preferred embodiments of the bicycle fork axles with non-round tapered ends of the present invention. In general, any non-round tapered ends including but not limited to triangularly, pentagonally, hexagonally or octagonally tapered ends are within the spirit and scope of the present invention for the bicycle fork axles.

Figure 2:
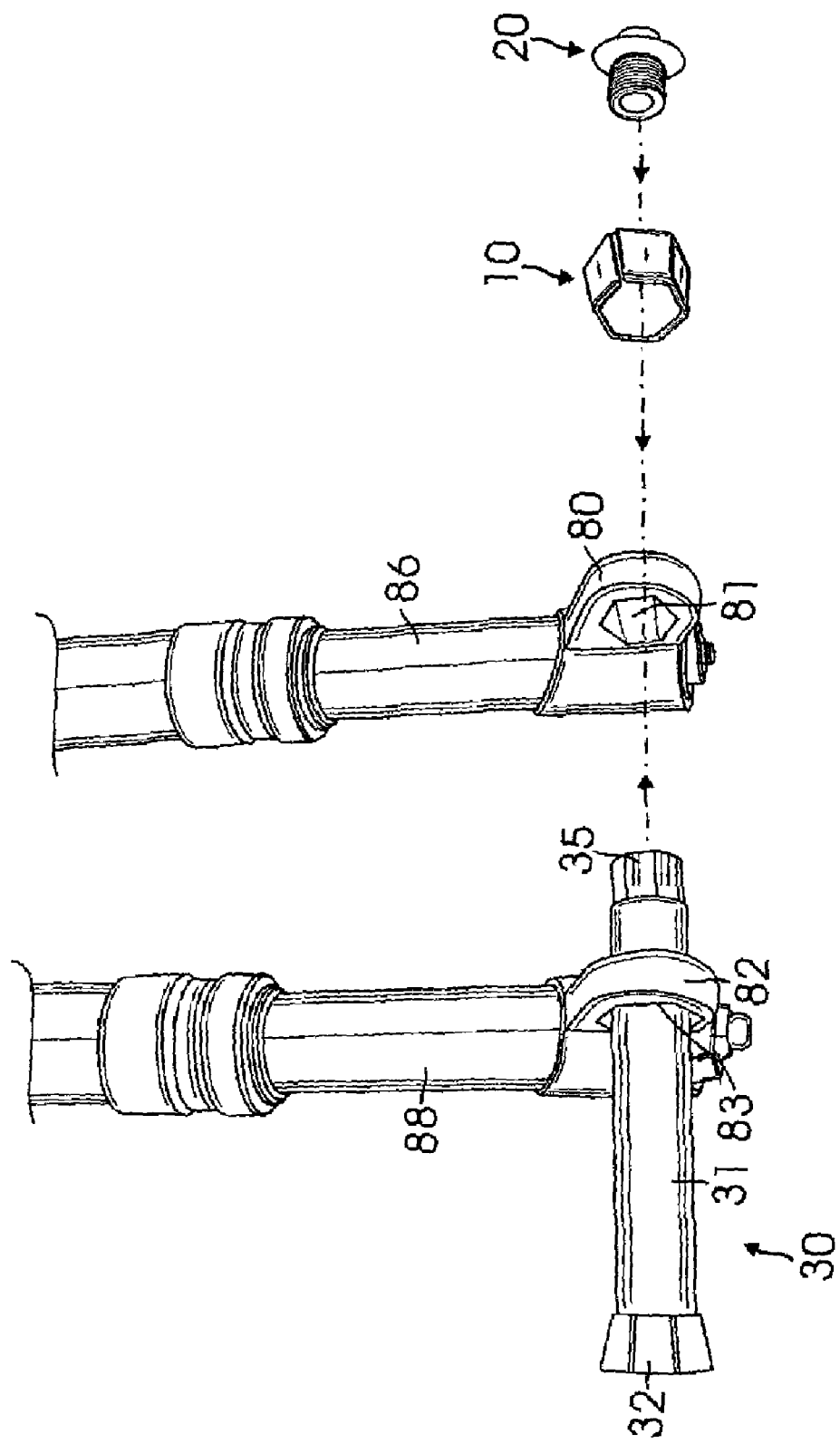
FIG. 2 is an exploded perspective view of one preferred embodiment of the present invention improved fork axle, which further illustrates how the fork axle is installed into a bicycle fork.

Referring specifically to the exploded perspective view from FIG. 2, there is illustrated each component of the present invention improved axle with non-round tapered end affixed into fork leg dropouts with openings that match the axle ends. The improved axle 100 comprises the improved tapered split hexagonal nut 10, the cylindrical bolt 20, and the axle body 30, wherein the axle body comprises the first hexagonally shaped end 35, connected to the intermediate cylindrical portion 31, which is connected to the second tapered hexagonal end 32. As further illustrated in FIG. 2, a first dropout 80 is located at a lower end of a first fork leg 86, wherein a first mating opening 81 at the center of the first dropout 80 matches the improved tapered split hexagonal nut 10. Accordingly, a second dropout 82 is at a lower end of the second fork leg 88, wherein a second mating opening 83 matches the second tapered end 32 of the axle body.

Figure 3A:
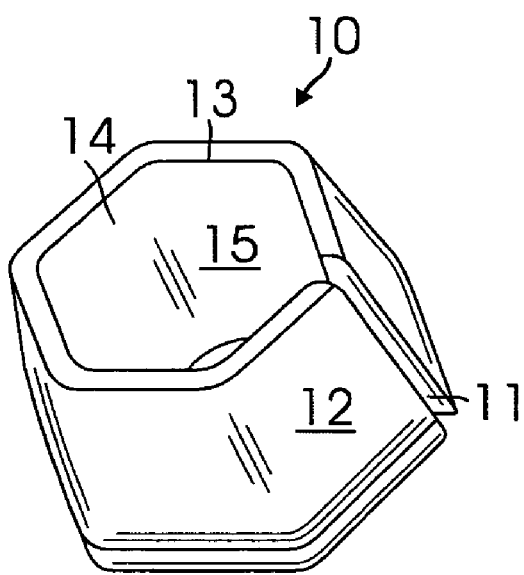
FIG. 3A is a perspective view of one preferred embodiment of the present invention improved tapered split non-round nut.
Figure 3B:
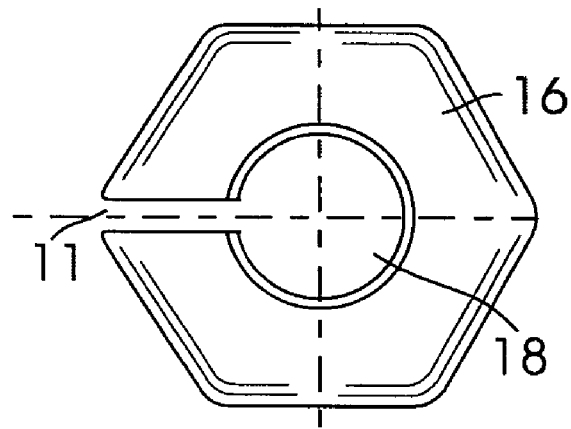
FIG. 3B is a rear view of one preferred embodiment of the present invention improved tapered split non-round nut.
Figure 3C:
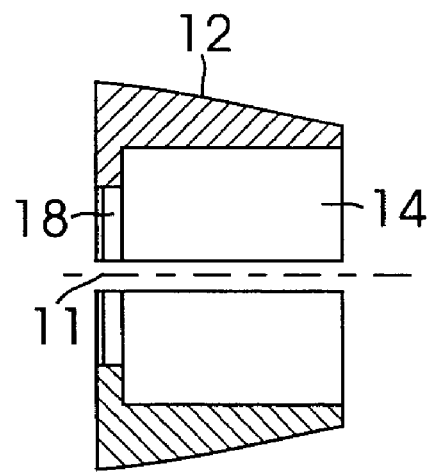
FIG. 3C is a cross-sectional view of one preferred embodiment of the present invention improved tapered split non-round nut.

The improved tapered split hexagonal nut 10 is further illustrated through a perspective view, rear view, and cross section view from respective FIGS. 3A, 3B and 3C, wherein the nut 10 is comprised of a rear end 16 containing a round opening 18 which is located at the center of the rear end, and an exterior tapered hexagonal wall 12 with a front edge 13 and split 11 which is aligned to an axis of the axle body 30. The exterior wall 12 further surrounds an interior hexagonal bore 14 possessing an interior hexagonal surface 15, which is used to surround the first axle end 35 of the hollow axle body.

Figure 4A:
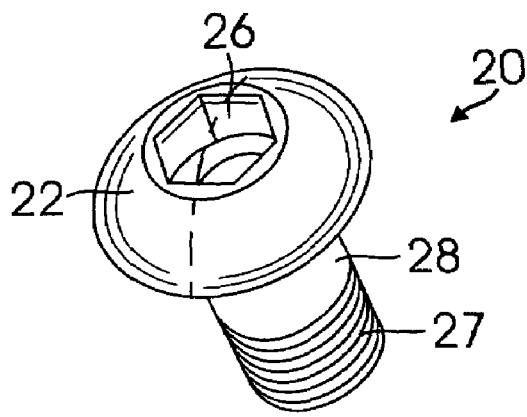
FIG. 4A is a perspective view of one preferred embodiment of the present invention hollow cylindrical bolt having a round head.
Figure 4B:
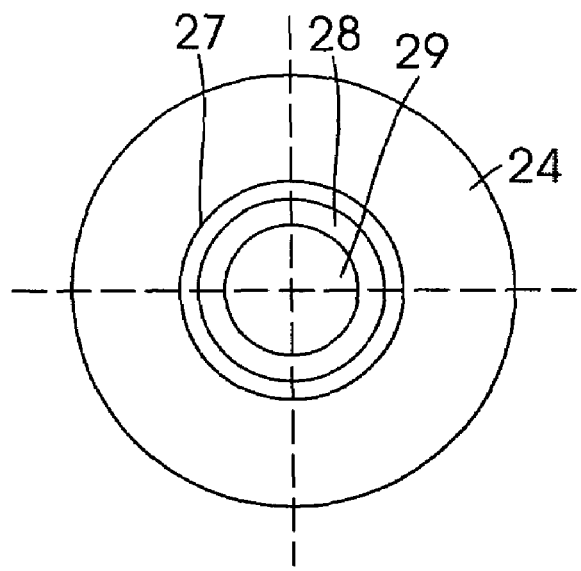
FIG. 4B is a rear view of one preferred embodiment of the present invention hollow cylindrical bolt having a round head.
Figure 4C:
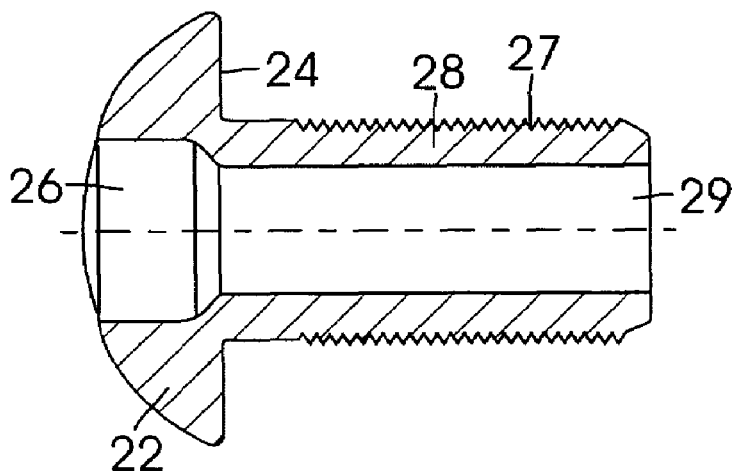
FIG. 4C is a cross-sectional view of one preferred embodiment of the present invention hallow cylindrical bolt having a round head.

Referring to FIGS. 4A, 4B, and 4C, there is illustrated hollow cylindrical bolt 20 with the round head 22 through a respective perspective, rear, and cross-sectional view. The hollow bolt 20 has an interior bore 29 which is comprised of a hollow neck 28 containing male threads 27, which transversely attaches at the center of a rear side 24 of an outer round head 22. The outer round head 22 is further illustrated at the center to have an interior hexagonal bore 26 with an interior hexagonal surface, from which a force can be applied to fasten the bolt.

Figure 5A:
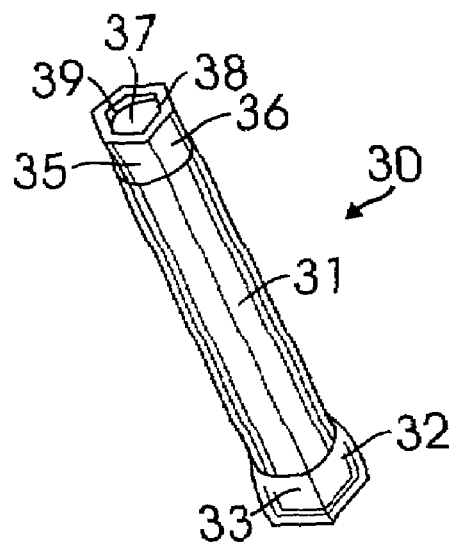
FIG. 5A is a perspective view of one preferred embodiment of the present invention hollow axle body having a first non-round end and second tapered non-round end.
Figure 5B:
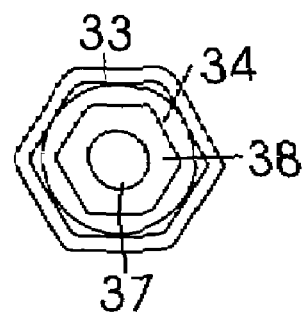
FIG. 5B is a rear view of one preferred embodiment of the present invention hollow axle body having a first non-round end and second tapered non-round end.
Figure 5C:
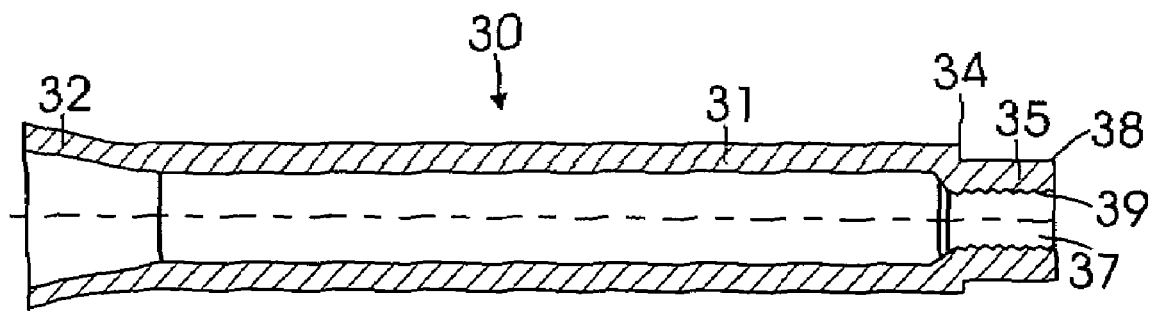
FIG. 5C is a cross-sectional view of one preferred embodiment of the present invention hollow axle body having a first non-round end and second tapered non-round end.

Referring to FIGS. 5A, 5B, and 5C, the hollow axle body 30 as one preferred embodiment of the present invention is illustrated to comprise the second tapered hexagonal end 32 with an exterior surface 33 at a preferred taper angle of 80 degrees, connected to an intermediate hollow cylindrical portion 31, which is further connected to the first hexagonally shaped end 35, wherein the first hexagonal end 35 possesses an exterior surface 36, a front edge 38 and an interior bore 37 containing female threads 39. In addition, the hollow axle body 30 is specifically illustrated to comprise a shoulder 34, which is located at the intersection where the hexagonal end 35 joins the intermediate cylindrical portion 31 of the axle. It will be appreciated that, while a hollow structure is preferred for the cylindrical bolt and axle body, a solid bolt and axle body are also within the scope and spirit of the present invention.

Figure 6:
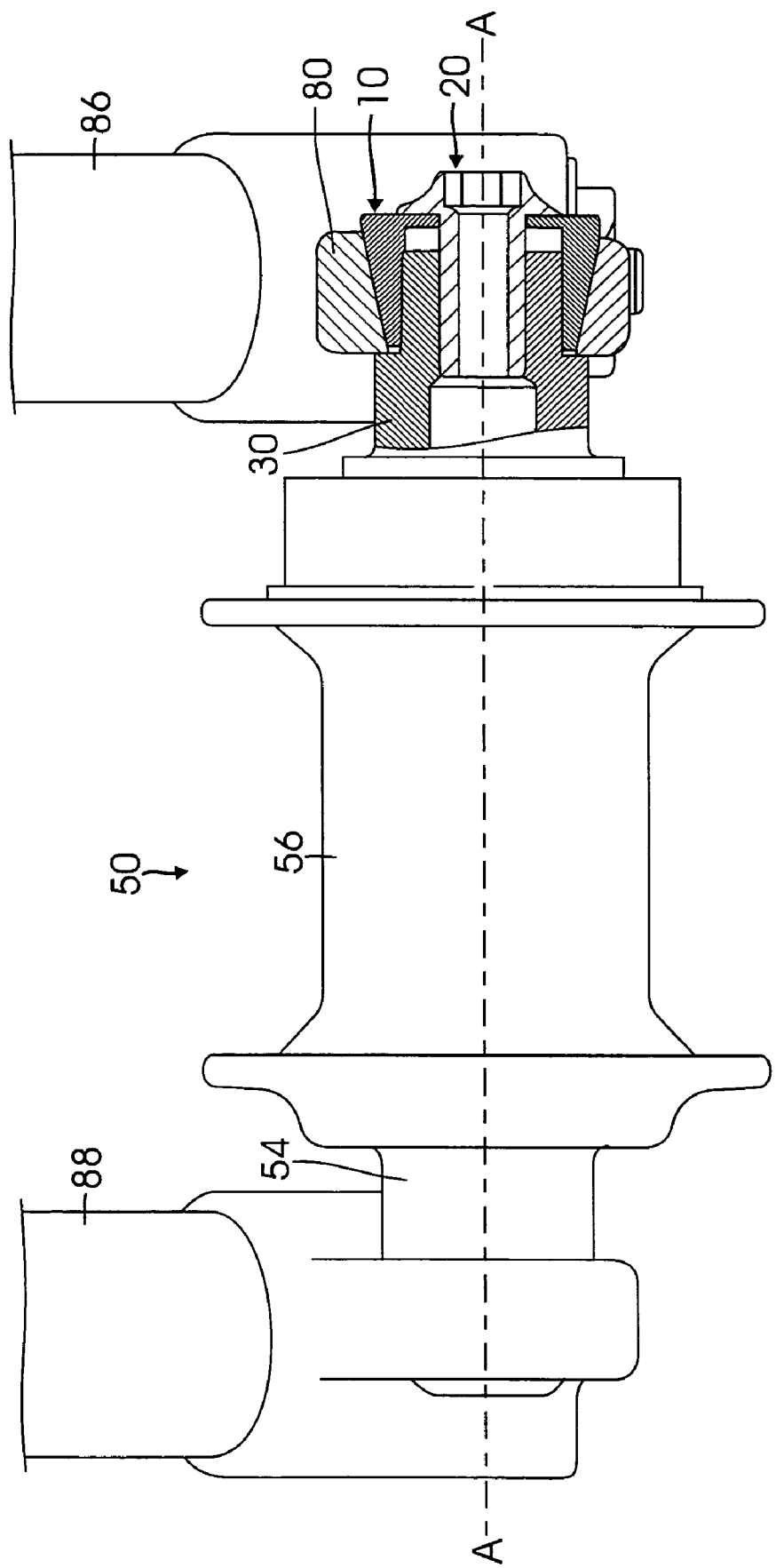
FIG. 6 is a front elevational view in partial cross section of one preferred embodiment of the present invention improved axle with non-round tapered end affixed into fork leg dropouts with openings that match the axle ends.
Figure 7:
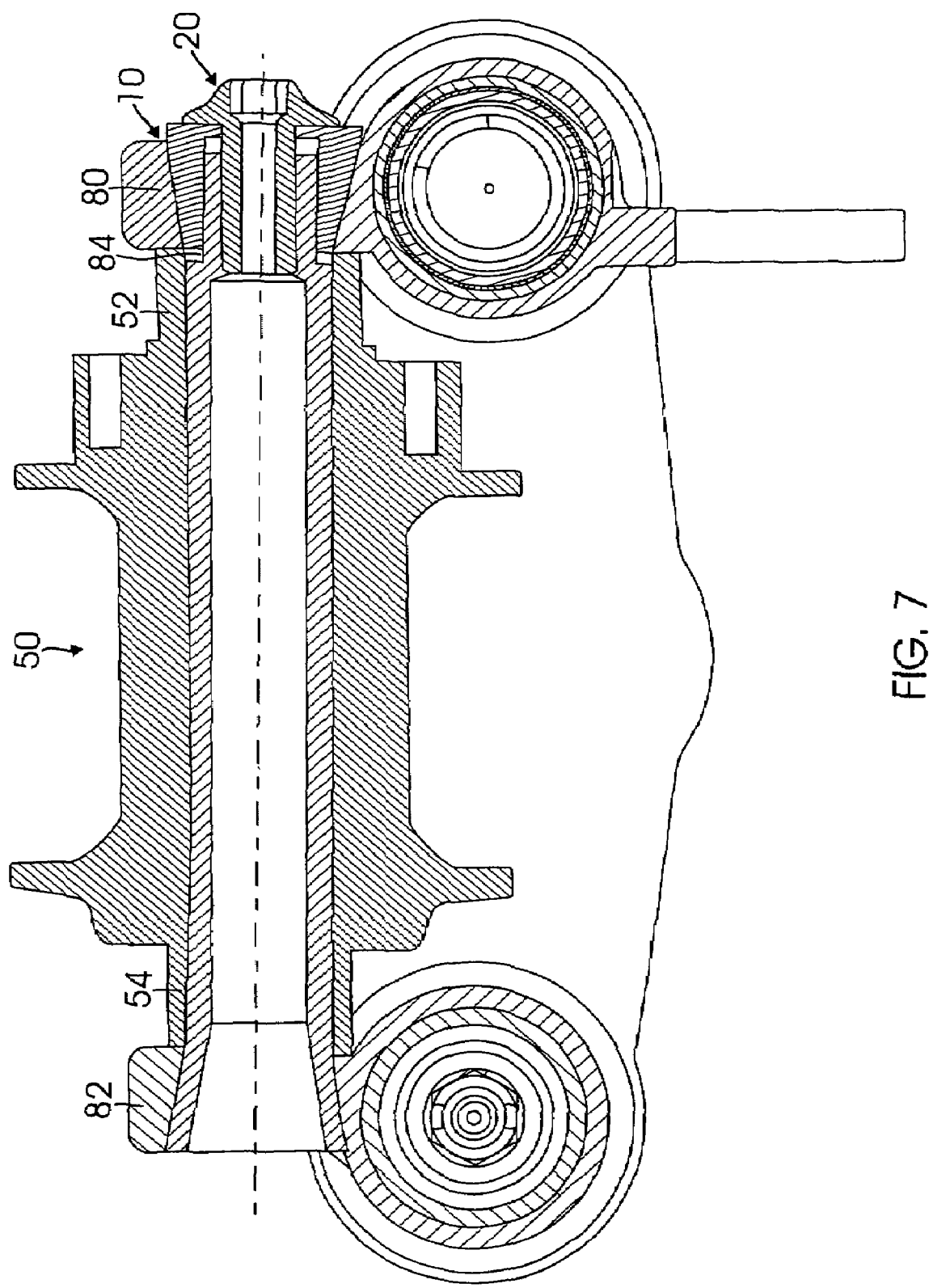
FIG. 7 is a cross-sectional view of one preferred embodiment of the present invention improved axle with non-round tapered end affixed into fork leg dropouts with openings that match the axle ends taking along line A-A of FIG. 6.

Although in the embodiment shown in FIGS. 6 and 7 it illustrates the structural configuration of the present invention after installation of the improved axle into the fork leg dropouts with openings that match the axle ends, FIG. 7, in addition to FIG. 2, is also applicable to illustrate the installation process of the axle 100 into the bicycle fork, wherein FIG. 7 is a cross-sectional view taken along line A-A of FIG. 6 to illustrate the installation of the present invention. As illustrated, the hollow axle body 30 at the first axle end 35 is inserted to extend through second dropout 82 which is affixed at a lower end of a second bicycle fork leg 88, and a wheel hub 50. The first axle end 35 is extended into a first dropout 80 which is affixed at a lower end of a first bicycle fork leg 86. After the improved tapered nut 10 is inserted to cover the first end of the axle body 30, the improved tapered split hexagonal nut 10 containing the first end 35 of the axle is placed into a mating opening 81 of the first dropout 80, and the second tapered hexagonal end 32 of the axle is located into a mating opening 83 of the second dropout 82. It is appreciated from the present invention as shown in FIG. 7 that the improved tapered split nut 10 with the exterior tapered hexagonal wall 12 matches a tapered interior hexagonal surface of the mating opening 81 located at the center of the first dropout 80, and the interior hexagonal surface 15 of the improved nut 10 matches the exterior hexagonal surface 36 of the first axle end 35.

As further illustrated in FIG. 7, the hollow cylindrical bolt 20 affixes the improved nut 10 onto the first axle hexagonal end 35 and within the mating opening 81 of the first dropout 80, wherein the hollow neck 28 of the bolt containing male threads 27 is screwed into the bore 37 containing female threads 39 of the first axle end 35. It is appreciated from the present invention that some space is arranged between the mating opening and the exterior surface of the improved nut, which includes a space 84 shown in FIG. 7, located between the front edge 13 of the hexagonal wall 12 of the improved split hexagonal nut 10 and the shoulder 28 of the axle body 30, so that the present invention can use the space through a taper-lock affixation to tightly affix the improved split hexagonal nut 10 so that it fills the first dropout 80 of the first fork leg 86. Because that the split 11 will be slightly compressed within the mating opening 81 under pressure from the cylindrical bolt 20 where the rear end 24 of the bolt 20 presses the rear end 16 of the improved nut 10 to affix into the mating opening 81, the result is a tight taper-lock affixation between the tapered nut 10 and the mating opening 81, Accordingly the tapered split hexagonal nut 10 is able to be easily removed after the cylindrical bolt 20 is loosened.

Similarly, the taper-lock affixation also occurs between the second end 32 of the axle body 30 and second dropout 82. As illustrated in FIG. 7, the second tapered hexagonal end 32 of the axle body 30 has the exterior surface 33 which matches the mating opening 83 having the hexagonal interior surface in the second dropout 82, wherein the second dropout is affixed onto a lower end of the second fork leg 88. It will be appreciated that the second tapered hexagonal end 32 of the axle will be simultaneously pulled towards and be affixed into the mating opening 83 of the second dropout 82 for a taper-lock affixation, when the cylindrical bolt 20 is screwed into the first axle end 35 of the axle to press the improved split tapered nut 10 into the mating opening 81 of the first dropout 80 for the taper-lock affixation and simultaneously pull the axle body 30 towards the first dropout 80. Therefore the present invention is able to provide an easy installation of the axle to the bicycle fork through the taper-lock affixation to achieve a strong torsional strength of the bicycle fork.

Figure 8:
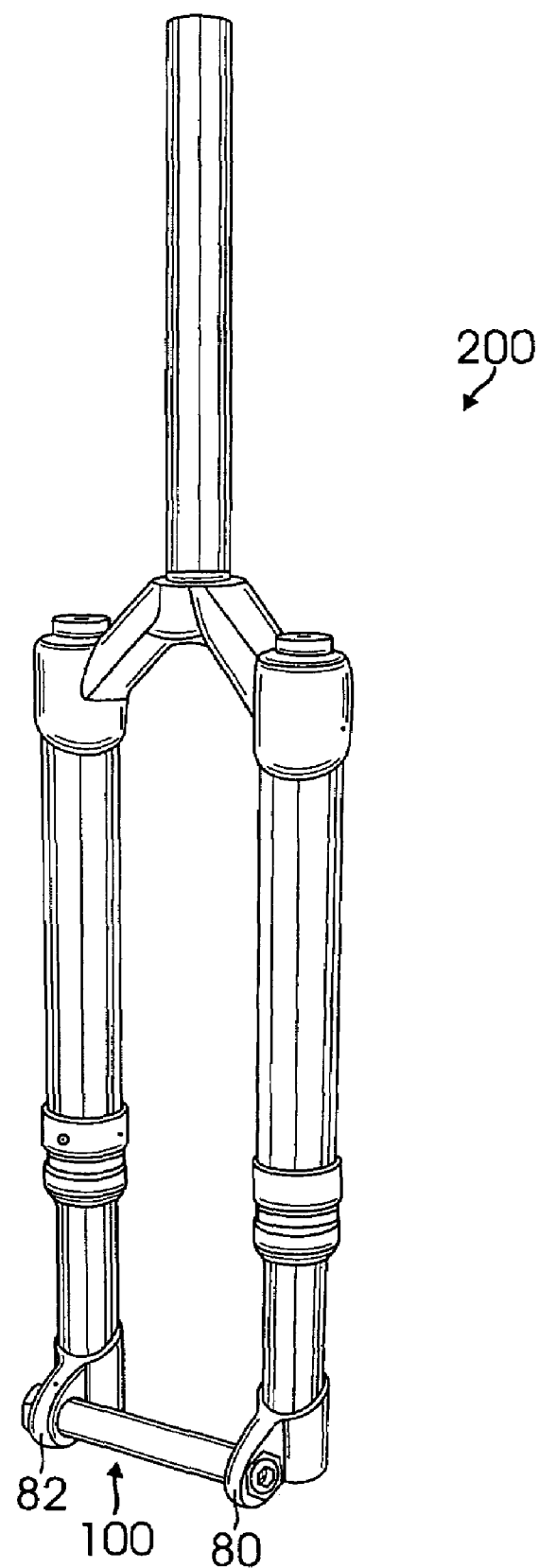
FIG. 8 is a perspective view of a front bicycle fork, which employs the present invention improved axle with non-round tapered end affixed into fork leg dropouts with openings that match the axle ends.

As a further illustrated in FIGS. 6 and 7, the wheel hub 50 is placed wherein a first and second end sleeve 52 and 54 of the hub are close to the respective first and second dropouts 80 and 82 of the first and second fork legs 86 and 88. Therefore an intermediate section 56 of the hub is able to transversely accommodate a front wheel of the bicycle. In addition, FIG. 8 illustrates a front bicycle fork 200, which employs the present invention improved axle with non-round tapered ends affixed into dropouts with openings to match the axle ends.

Figure 9:
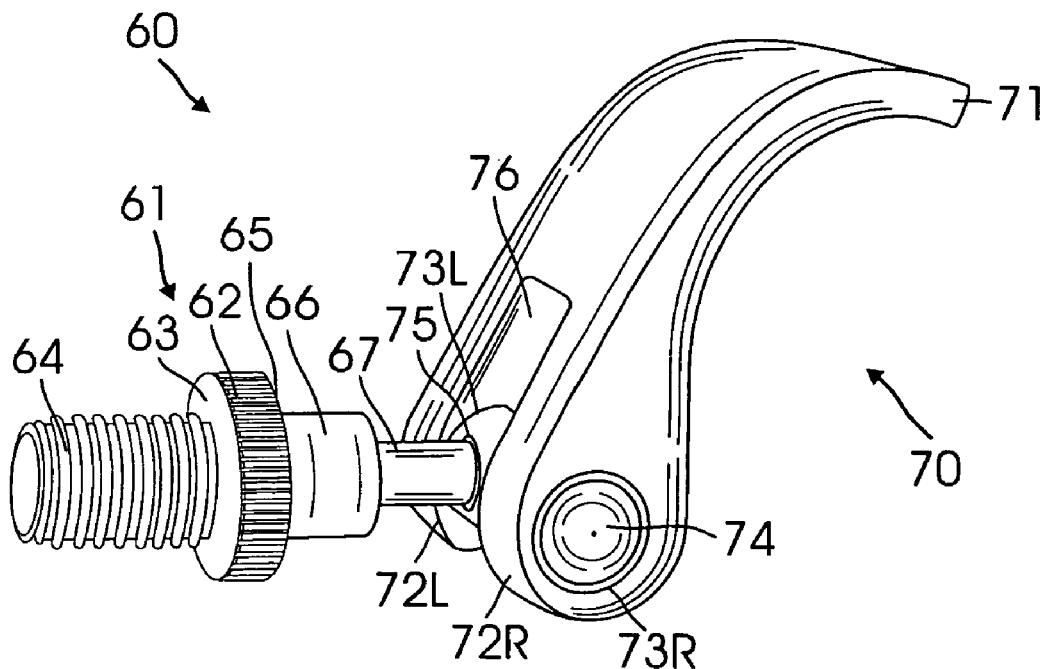
FIG. 9 is a perspective view of an another preferred embodiment of the present invention cylindrical bolt having a quick release handle, wherein the handle is rotated to an extended position.
Figure 10:
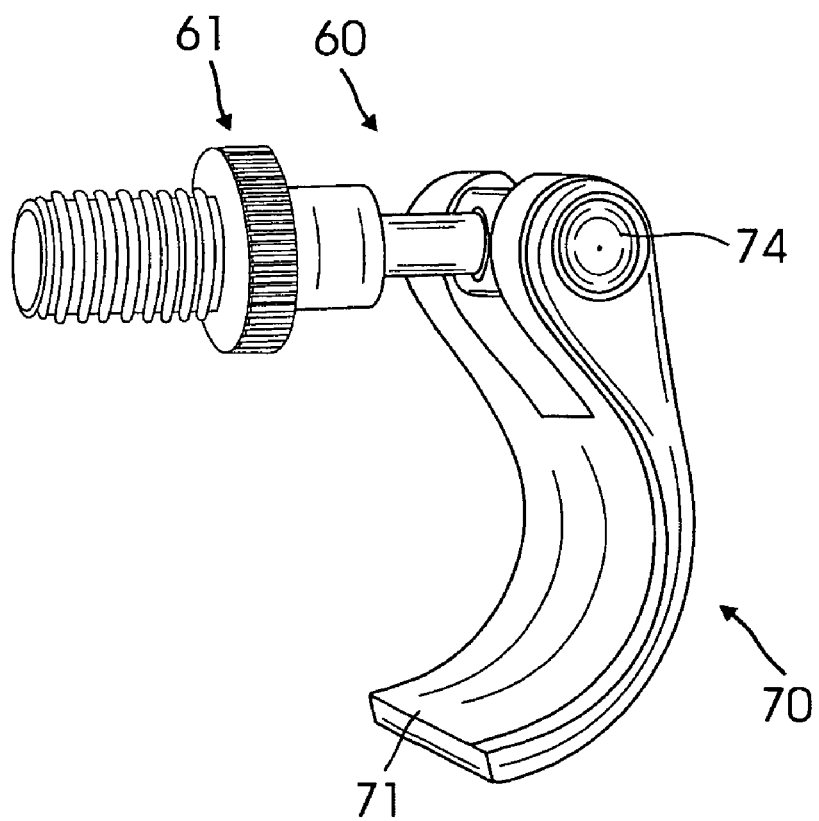
FIG. 10 is a perspective view of an another preferred embodiment of the present invention cylindrical bolt having a quick release handle, wherein the handle is rotated to a closed position.

In addition to the preferred embodiment for the hollow cylindrical bolt 20 illustrated in FIGS. 4A, 4B and 4C, the present invention can provide a variation of the male threaded bolt 20 as an another preferred embodiment, which is illustrated in FIGS. 9 and 10. This alternative preferred embodiment 60 is a rotatable clamp which includes a male threaded cylindrical bolt 61 connected to a rotatable handle 70 to facilitate ease of the axle installation. The male threaded cylindrical bolt 61 comprises a threaded end 64, a non-threaded shoulder 66, a transverse disc member 62 having a first and second ring surface 63 and 65 which joins the threaded portion 64 and non-threaded portion 66 of the male threaded bolt 61, and a round connecting rod 67 coaxially affixed onto the non-threaded end 66 of the threaded bolt 61. The rotatable handle 70 is a curved apparatus, comprising a bottom end 71, and a head wherein an opening 76 divides the head into a symmetrical right portion 72R and a left portion 72L. A transverse round rod 74 is rotatably connected to the right and left portions 72R and 72L of the handle 70 through a respective hole 73R and 73L located in the right and left portion 72R and 72L of the head. As further illustrated, the transverse round rod 74 at its center position 75 is perpendicularly affixed to the round connecting rod 67. It will be appreciated that the handle 70 is rotatable around the transverse round rod 74 as the center of rotation. The handle 70 is rotated to an extended position, which is illustrated in FIG. 9, and the handle 70 is at a closed position as illustrated in FIG. 10.

Figure 11:
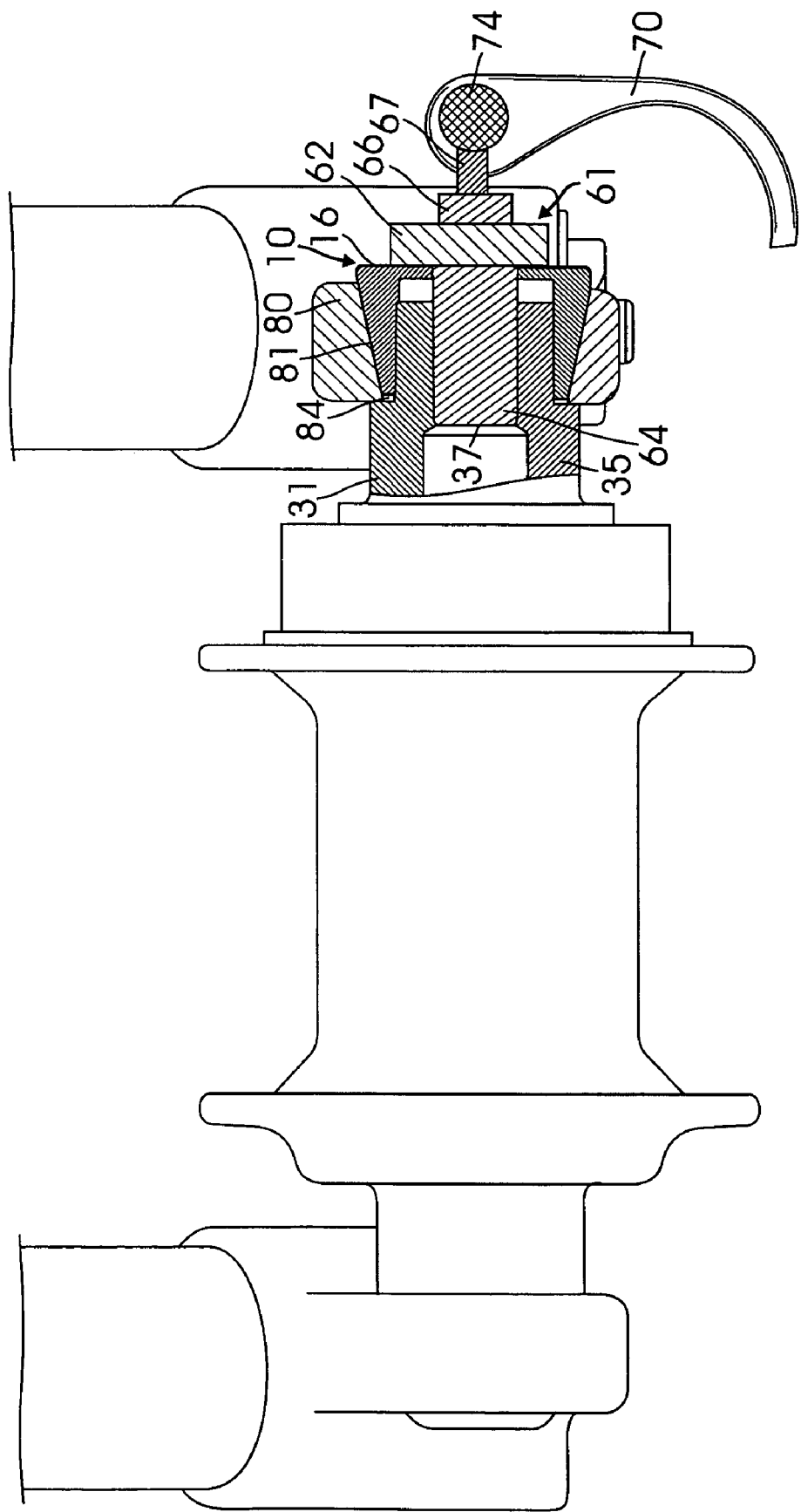
FIG. 11 is a front elevational view in partial cross section of one preferred embodiment of the present invention improved axle with non-round tapered end affixed into fork leg dropouts with openings that match the axle ends, wherein the another preferred embodiment of the cylindrical bolt having a quick release handle is employed.
Figure 12:
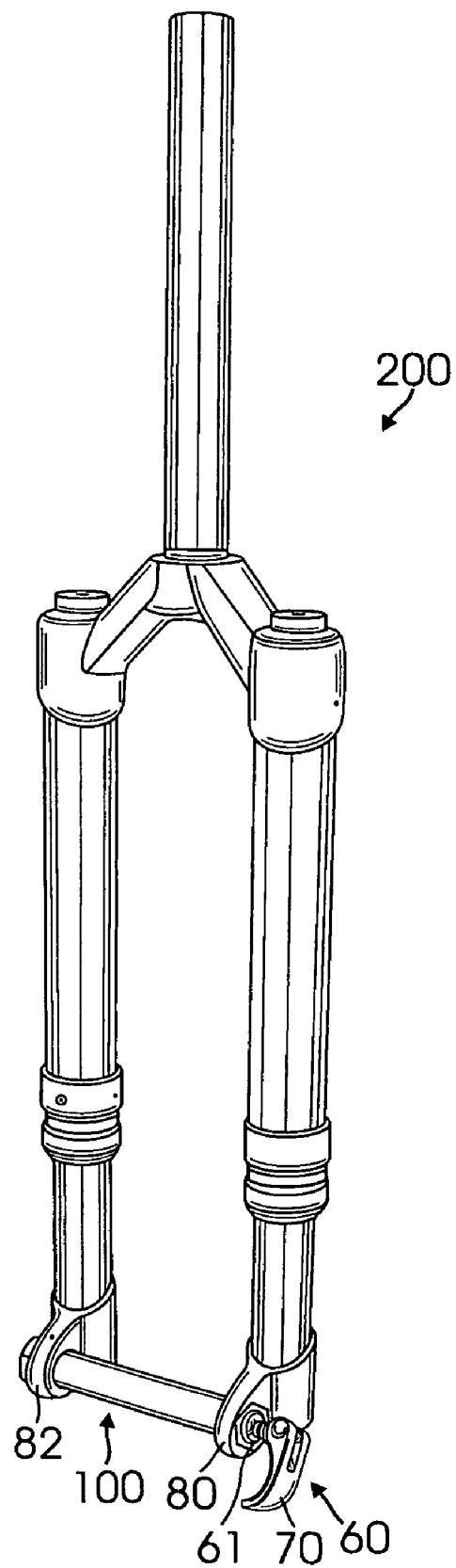
FIG. 12 is a perspective view of a front bicycle fork, which employs the present invention improved axle with non-round tapered end affixed into fork leg dropouts with openings that match the axle ends, wherein the another preferred embodiment of the cylindrical bolt having a quick release handle is employed.

Referring to FIG. 11, the male threaded bolt 61 is connected to the handle 70 so as to affix the improved nut 10 into the first axle hexagonal end 35 and within the mating opening 81 of the first dropout 80, wherein the male threaded end 64 of the bolt 61 is screwed into the bore 37 containing female threads of the first axle end 35. It will be appreciated that during the affixation process, the improved nut 10 at its outer surface 16 is pressed by the bolt 61 with the disc member 62 into the mating opening 81 of the first dropout 80, wherein the bolt 61 which is connected to the handle 70 is rotated to threadedly connect the threaded head 35 of the axle. It will be appreciated that with the aid of the handle 70 which can provide the leverage to overcome a threading resistance, the male threaded bolt 61 can be easily tightened or released. FIG. 13 illustrates this alternative embodiment 60 of the male threaded bolt 61 connected to the rotatable handle 70 as it is affixed to the front bicycle fork 200.

Defined in detail, the present invention is an improved axle which is used to be affixed into dropouts of a bicycle fork leg, comprising: (a) a tapered split non-round nut having a rear end with a round opening located at a center of the rear end, an exterior tapered non-round wall with a front edge and having a split extending from the front edge to the rear end, the exterior wall defining an interior non-round bore having an interior non-round surface; (b) a hollow cylindrical bolt with an outer round head comprising a hollow neck containing male threads, the hollow neck transversely attached at a center location of a rear side of the outer round head, the outer round head having an interior hexagonal bore with an interior hexagonal surface; (c) a hollow axle body comprising a first non-round shaped end connected to an intermediate hollow cylindrical portion which in turn is connected to a second tapered non-round end with an exterior surface, the first non-round end having an exterior non-round surface, a front edge and an interior bore containing female threads, the hollow axle body comprising a shoulder located at the intersection of the intermediate hollow cylindrical portion and the first non-round end, the exterior non-round surface of the first non-round end matching the interior non-round surface of the bore of the tapered split non-round nut; (d) a first dropout containing a first mating opening, wherein said first dropout is affixed at a lower end of a first bicycle fork leg, a second dropout containing a second mating opening, wherein the second dropout is affixed at a lower end of a second bicycle fork leg, said first mating opening matches said exterior wall of the tapered split non-round nut, said second mating opening matches said exterior surface of the second tapered non-round end of said axle body; and (e) the improved axle affixed into the dropouts of the fork legs by having the improved axle inserted into second dropout so that the second tapered non-round end of the axle body is inserted into and matches the mating opening of the second dropout and the first non-round end of the improved axle is inserted through the mating opening of the first dropout and the split non-round nut is positioned over the first non-round end of the axle and tightened thereto by threading the hollow bolt into the threads in the first non-round end, the tapered split non-round nut being tightened into the first dropout opening while the tapered second end of the axle is pulled into said second mating opening when said cylindrical bolt is threaded into said first end of the axle.

Defined more broadly, the present invention is an improved axle which is used to be affixed into dropouts of a bicycle fork leg, comprising: (a) a tapered split non-round nut having a rear end with an opening to receive a threaded bolt, an exterior tapered non-round wall with a front edge and having a split extending from the front edge to the rear end, the exterior wall defining an interior bore; (b) a cylindrical bolt with an outer head and having neck containing male threads, the neck transversely attached at a rear side of the head, the head having driving means therein; (c) an axle body comprising a first end connected to an intermediate cylindrical portion which in turn is connected to a second non-round end with an exterior surface, the first end having an exterior surface, a front edge and an interior bore containing female threads, the first end received within the tapered split non-round nut; (d) a first dropout containing a first mating opening, wherein said first dropout is affixed at a lower end of a first bicycle fork leg, a second dropout containing a second mating opening, wherein the second dropout is affixed at a lower end of a second bicycle fork leg, said first mating opening matches said exterior wall of the tapered split non-round nut, said second mating opening matches said exterior surface of the second tapered non-round end of said axle body; and (e) the improved axle affixed into the dropouts of the fork legs by having the improved axle inserted into second dropout so that the second tapered non-round end of the axle body is inserted into and matches the mating opening of the second dropout and the first end of the improved axle is inserted through the mating opening of the first dropout and the split non-round nut is positioned over the first end of the axle and tightened thereto by threading the bolt into the threads in the first end, the tapered split non-round nut being tightened into the first dropout opening while the tapered second end of the axle is pulled into said second mating opening when said cylindrical bolt is threaded into said first end of the axle.

Defined even more broadly, the present invention is an improved axle which is used to be affixed into dropouts of a bicycle fork leg, comprising: (a) a tapered split non-round nut having a rear end with an opening to receive a first mating fastening means, an exterior tapered non-round wall with a front edge and having a split extending from the front edge to the rear end, the tapered split-non-round nut having an interior bore; (b) a mating fastening means; (c) an axle body comprising a first end connected to an intermediate portion which in turn is connected to a second non-round end with an exterior surface, the first end having an exterior surface and a second mating fastening means, the first end received within the bore of tapered split non-round nut; (d) a first dropout containing a first mating opening, wherein said first dropout is affixed at a lower end of a first bicycle fork leg, a second dropout containing a second mating opening, wherein the second dropout is affixed at a lower end of a second bicycle fork leg, said first mating opening matches said exterior wall of the tapered split non-round nut, said second mating opening matches said exterior surface of the second tapered non-round end of said axle body; and (e) the improved axle affixed into the dropouts of the fork legs by having the improved axle inserted into second dropout so that the second tapered non-round end of the axle body is inserted into and matches the mating opening of the second dropout and the first end of the improved axle is inserted through the mating opening of the first dropout and the split non-round nut is positioned over the first end of the axle and tightened thereto by fastening the first and second mating fasting means together, the tapered split non-round nut being tightened into the first dropout opening while the tapered second end of the axle is pulled into said second mating opening.

Defined even more broadly, the present invention is an improved axle which is used to be affixed into dropouts of a bicycle fork leg, comprising: (a) a tapered split non-round nut having a rear end with an opening to receive a first mating fastening means, an exterior tapered non-round wall with a front edge and having a split extending from the front edge to the rear end, the tapered split-non-round nut having an interior bore; (b) a mating fastening means; (c) an axle body comprising a first end connected to an intermediate portion which in turn is connected to a second end with an exterior surface, the first end having an exterior surface and a second mating fastening means, the first end received within the bore of tapered split non-round nut; (d) a first dropout containing a first mating opening, wherein said first dropout is affixed at a lower end of a first bicycle fork leg, a second dropout containing a second mating opening, wherein the second dropout is affixed at a lower end of a second bicycle fork leg, said first mating opening matches said exterior wall of the tapered split non-round nut, said second mating opening matches said exterior surface of the second end of said axle body; and (e) the improved axle affixed into the dropouts of the fork legs by having the improved axle inserted into second dropout so that the second end of the axle body is inserted into and matches the mating opening of the second dropout and the first end of the improved axle is inserted through the mating opening of the first dropout and the split non-round nut is positioned over the first end of the axle and tightened thereto by fastening the first and second mating fasting means together, the tapered split non-round nut being tightened into the first dropout opening while the second end of the axle is pulled into said second mating opening.

Defined even more broadly, the present invention is an improved axle which is used to be affixed into dropouts of a bicycle fork, comprising: (a) an improved axle comprising a tapered split non-round nut including an exterior tapered non-round wall with a split and having an interior bore and means for receiving a bolt, a bolt including a neck containing male threads, an axle body including a first end and a second tapered non-round end, wherein the first end includes an interior bore containing female threads, said first end matches the interior bore of the tapered split non-round nut; (b) a first and second dropout containing a respective first and second mating opening, said first mating opening matches said exterior wall of the tapered split non-round nut, said second mating opening matches said second tapered non-round end of said axle body; and (c) the improved axle is affixed into the dropouts so that the second tapered non-round end is affixed into the mating second dropout and the tapered split non-round nut is positioned over the first end of the axle and is tightened by threading the threaded bolt into the female threads of the first axle end so that the tapered non-rod split nut is tightened into the mating first dropout.

Defined most broadly, the present invention is an improved axle which is used to be affixed into dropouts of a bicycle fork, comprising: (a) an improved axle comprising a tapered split non-round nut including an exterior tapered non-round wall with a split and having an interior bore and means for receiving a first fastening means, a first fastening means, an axle body including a first end and a second end, wherein the first end includes a mating second fastening means, said first end matches the interior bore of the tapered split non-round nut; (b) a first and second dropout containing a respective first and second mating opening, said first mating opening matches said exterior wall of the tapered split non-round nut, said second mating opening matches said second end of said axle body; and (c) the improved axle is affixed into the dropouts so that the second end is affixed into the mating second dropout and the tapered split non-round nut is positioned over the first end of the axle and is tightened by the mating fastening means so that the tapered non-rod split nut is tightened into the mating first dropout.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An improved axle which is used to be affixed into dropouts of a bicycle fork leg, comprising:
    a. a tapered split non-round nut having a rear end with a round opening located at a center of the rear end, an exterior tapered non-round wall with a front edge and having a split extending from the front edge to the rear end, the exterior wall defining an interior non-round bore having an interior non-round surface;
    b. a hollow cylindrical bolt with an outer round head comprising a hollow neck containing male threads, the hollow neck transversely attached at a center location of a rear side of the outer round head, the outer round head having an interior hexagonal bore with an interior hexagonal surface;
    c. a hollow axle body comprising a first non-round shaped end connected to an intermediate hollow cylindrical portion which in turn is connected to a second tapered non-round end with an exterior surface, the first non-round end having an exterior non-round surface, a front edge and an interior bore containing female threads, the hollow axle body comprising a shoulder located at the intersection of the intermediate hollow cylindrical portion and the first non-round end, the exterior non-round surface of the first non-round end matching the interior non-round surface of the bore of the tapered split non-round nut;
    d. a first dropout containing a first mating opening, wherein said first dropout is affixed at a lower end of a first bicycle fork leg, a second dropout containing a second mating opening, wherein the second dropout is affixed at a lower end of a second bicycle fork leg, said first mating opening matches said exterior wall of the tapered split non-round nut, said second mating opening matches said exterior surface of the second tapered non-round end of said axle body; and
    e. the improved axle affixed into the dropouts of the fork legs by having the improved axle inserted into second dropout so that the second tapered non-round end of the axle body is inserted into and matches the mating opening of the second dropout and the first non-round end of the improved axle is inserted through the mating opening of the first dropout and the split non-round nut is positioned over the first non-round end of the axle and tightened thereto by threading the hollow bolt into the threads in the first non-round end, the tapered split non-round nut being tightened into the first dropout opening while the tapered second end of the axle is pulled into said second mating opening when said cylindrical bolt is threaded into said first end of the axle.

2. The improved axle in accordance with claim 1, wherein the shape of the exterior tapered non-round wall of the split non-round nut and the matching shape of the mating opening in the first dropout is selected from the group comprising hexagonal, triangular, pentagonal and octagonal in shape.

3. The improved axle in accordance with claim 1, wherein the shape of the second tapered non-round end of the axle body and the matching shape of the mating opening in the second dropout is selected from the group comprising hexagonal, triangular, pentagonal and octagonal in shape.

4. The improved axle in accordance with claim 1, wherein said hollow cylindrical bolt further comprises a male threaded bolt connected to a rotatable handle for ease of the axle installation, said male threaded bolt having of a threaded end connected to a transverse disc member which further connects to a non-threaded shoulder which is coaxially affixed to a round connecting rod with a rotatable handle having an end and a head containing an opening to divide the head into a symmetrical right portion and a left portion, a transverse round rod rotatably connected to the right and left portion of the head of the handle, the round transverse rod at its center position perpendicularly affixed to the round connecting rod of the bolt.

5. An improved axle which is used to be affixed into dropouts of a bicycle fork leg, comprising:
    a. a tapered split non-round nut having a rear end with an opening to receive a threaded bolt, an exterior tapered non-round wall with a front edge and having a split extending from the front edge to the rear end, the exterior wall defining an interior bore;
    b. a cylindrical bolt with an outer head and having neck containing male threads, the neck transversely attached at a rear side of the head, the head having driving means therein;
    c. an axle body comprising a first end connected to an intermediate cylindrical portion which in turn is connected to a second non-round end with an exterior surface, the first end having an exterior surface, a front edge and an interior bore containing female threads, the first end received within the tapered split non-round nut;
    d. a first dropout containing a first mating opening, wherein said first dropout is affixed at a lower end of a first bicycle fork leg, a second dropout containing a second mating opening, wherein the second dropout is affixed at a lower end of a second bicycle fork leg, said first mating opening matches said exterior wall of the tapered split non-round nut, said second mating opening matches said exterior surface of the second tapered non-round end of said axle body; and
    e. the improved axle affixed into the dropouts of the fork legs by having the improved axle inserted into second dropout so that the second tapered non-round end of the axle body is inserted into and matches the mating opening of the second dropout and the first end of the improved axle is inserted through the mating opening of the first dropout and the split non-round nut is positioned over the first end of the axle and tightened thereto by threading the bolt into the threads in the first end, the tapered split non-round nut being tightened into the first dropout opening while the tapered second end of the axle is pulled into said second mating opening when said cylindrical bolt is threaded into said first end of the axle.

6. The improved axle in accordance with claim 5, wherein the shape of the exterior tapered non-round wall of the split non-round nut and the matching shape of the mating opening in the first dropout is selected from the group comprising hexagonal, triangular, pentagonal and octagonal in shape.

7. The improved axle in accordance with claim 5, wherein the shape of the second tapered non-round end of the axle body and the matching shape of the mating opening in the second dropout is selected from the group comprising hexagonal, triangular, pentagonal and octagonal in shape.

8. The improved axle in accordance with claim 5, wherein said cylindrical bolt further comprises a rotatable clamp mechanism by which the bolt can be quickly tightened or released.

9. An improved axle which is used to be affixed into dropouts of a bicycle fork leg, comprising:
   a. a tapered split non-round nut having a rear end with an opening to receive a first mating fastening means, an exterior tapered non-round wall with a front edge and having a split extending from the front edge to the rear end, the tapered split-non-round nut having an interior bore;
   b. a mating fastening means;
   c. an axle body comprising a first end connected to an intermediate portion which in turn is connected to a second non-round end with an exterior surface, the first end having an exterior surface and a second mating fastening means, the first end received within the bore of tapered split non-round nut;
   d. a first dropout containing a first mating opening, wherein said first dropout is affixed at a lower end of a first bicycle fork leg, a second dropout containing a second mating opening, wherein the second dropout is affixed at a lower end of a second bicycle fork leg, said first mating opening matches said exterior wall of the tapered split non-round nut, said second mating opening matches said exterior surface of the second tapered non-round end of said axle body; and
   e. the improved axle affixed into the dropouts of the fork legs by having the improved axle inserted into second dropout so that the second tapered non-round end of the axle body is inserted into and matches the mating opening of the second dropout and the first end of the improved axle is inserted through the mating opening of the first dropout and the split non-round nut is positioned over the first end of the axle and tightened thereto by fastening the first and second mating fasting means together, the tapered split non-round nut being tightened into the first dropout opening while the tapered second end of the axle is pulled into said second mating opening.

10. The improved axle in accordance with claim 9, wherein the shape of the exterior tapered non-round wall of the split non-round nut and the matching shape of the mating opening in the first dropout is selected from the group comprising hexagonal, triangular, pentagonal and octagonal in shape.

11. The improved axle in accordance with claim 9, wherein the shape of the second tapered non-round end of the axle body and the matching shape of the mating opening in the second dropout is selected from the group comprising hexagonal, triangular, pentagonal and octagonal in shape.

12. The improved axle in accordance with claim 9, wherein said mating fastening means further comprises a rotatable clamp mechanism by which the mating fastening means can be quickly tightened or released.

13. An improved axle which is used to be affixed into dropouts of a bicycle fork leg, comprising:
   a. a tapered split non-round nut having a rear end with an opening to receive a first mating fastening means, an exterior tapered non-round wall with a front edge and having a split extending from the front edge to the rear end, the tapered split-non-round nut having an interior bore;
   b. a mating fastening means;
   c. an axle body comprising a first end connected to an intermediate portion which in turn is connected to a second end with an exterior surface, the first end having an exterior surface and a second mating fastening means, the first end received within the bore of tapered split non-round nut;
   d. a first dropout containing a first mating opening, wherein said first dropout is affixed at a lower end of a first bicycle fork leg, a second dropout containing a second mating opening, wherein the second dropout is affixed at a lower end of a second bicycle fork leg, said first mating opening matches said exterior wall of the tapered split non-round nut, said second mating opening matches said exterior surface of the second end of said axle body; and
   e. the improved axle affixed into the dropouts of the fork legs by having the improved axle inserted into second dropout so that the second end of the axle body is inserted into and matches the mating opening of the second dropout and the first end of the improved axle is inserted through the mating opening of the first dropout and the split non-round nut is positioned over the first end of the axle and tightened thereto by fastening the first and second mating fasting means together, the tapered split non-round nut being tightened into the first dropout opening while the second end of the axle is pulled into said second mating opening.

14. The improved axle in accordance with claim 13, wherein the shape of the exterior tapered non-round wall of the split non-round nut and the matching shape of the mating opening in the first dropout is selected from the group comprising hexagonal, triangular, pentagonal and octagonal in shape.

15. The improved axle in accordance with claim 13, wherein said mating fastening means further comprises a rotatable clamp mechanism by which the mating fastening means can be quickly tightened or released.

16. An improved axle which is used to be affixed into dropouts of a bicycle fork, comprising:
   a. an improved axle comprising a tapered split non-round nut including an exterior tapered non-round wall with a split and having an interior bore and means for receiving a bolt, a bolt including a neck containing male threads, an axle body including a first end and a second tapered non-round end, wherein the first end includes an interior bore containing female threads, said first end matches the interior bore of the tapered split non-round nut;
   b. a first and second dropout containing a respective first and second mating opening, said first mating opening matches said exterior wall of the tapered split non-round nut, said second mating opening matches said second tapered non-round end of said axle body; and
   c. the improved axle is affixed into the dropouts so that the second tapered non-round end is affixed into the mating second dropout and the tapered split non-round nut is positioned over the first end of the axle and is tightened by threading the threaded bolt into the female threads of the first axle end so that the tapered non-rod split nut is tightened into the mating first dropout.

17. The improved axle in accordance with claim 16, wherein the shape of the exterior tapered non-round wall of the split non-round nut and the matching shape of the mating opening in the first dropout is selected from the group comprising hexagonal, triangular, pentagonal and octagonal in shape.

18. The improved axle in accordance with claim 16, wherein the shape of the second tapered non-round end of the axle body and the matching shape of the mating opening in the second dropout is selected from the group comprising hexagonal, triangular, pentagonal and octagonal in shape.

19. The improved axle in accordance with claim 16, wherein said bolt further comprises a handle to facilitate rapid tightening and release of the bolt.

20. An improved axle which is used to be affixed into dropouts of a bicycle fork, comprising:
   a. an improved axle comprising a tapered split non-round nut including an exterior tapered non-round wall with a split and having an interior bore and means for receiving a first fastening means, a first fastening means, an axle body including a first end and a second end, wherein the first end includes a mating second fastening means, said first end matches the interior bore of the tapered split non-round nut;
   b. a first and second dropout containing a respective first and second mating opening, said first mating opening matches said exterior-wall of the tapered split non-round nut, said second mating opening matches said second end of said axle body; and
   c. the improved axle is affixed into the dropouts so that the second end is affixed into the mating second dropout and the tapered split non-round nut is positioned over the first end of the axle and is tightened by the mating fastening means so that the tapered non-rod split nut is tightened into the mating first dropout.

21. The improved axle in accordance with claim 20, wherein the shape of the exterior tapered non-round wall of the split non-round nut and the matching shape of the mating opening in the first dropout is selected from the group comprising hexagonal, triangular, pentagonal and octagonal in shape.

22. The improved axle in accordance with claim 20, wherein said first fastening means further comprising a handle for ease of the axle installation.

\* \* \* \* \*